US012500973B2

(12) United States Patent
Nicholson et al.

(10) Patent No.: US 12,500,973 B2
(45) Date of Patent: Dec. 16, 2025

(54) APPARATUSES, METHODS, AND COMPUTER-READABLE MEDIUM FOR REDUCING INADVERTENT USER INTERFACE INTERACTIONS

(71) Applicant: Lenovo (Singapore) Pte. Ltd., New Tech Park (SG)

(72) Inventors: John W. Nicholson, Cary, NC (US); Daryl C. Cromer, Raleigh, NC (US); Howard Locker, Cary, NC (US); Mengnan Wang, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 664 days.

(21) Appl. No.: 17/899,390

(22) Filed: Aug. 30, 2022

(65) Prior Publication Data

US 2024/0073312 A1 Feb. 29, 2024

(51) Int. Cl.
*H04M 1/67* (2006.01)
(52) U.S. Cl.
CPC ..................................... *H04M 1/67* (2013.01)
(58) Field of Classification Search
None
See application file for complete search history.

(56) References Cited

U.S. PATENT DOCUMENTS

| | | | | |
|---|---|---|---|---|
| 2010/0255820 A1* | 10/2010 | Maly | ............... | H04M 1/724631 455/414.1 |
| 2013/0203397 A1* | 8/2013 | Vidal | ............... | H04W 12/06 455/418 |
| 2013/0337790 A1* | 12/2013 | Oh | ............... | H04M 3/385 455/414.1 |
| 2015/0312197 A1* | 10/2015 | Dong | ............... | G06F 3/0481 715/752 |
| 2020/0151620 A1* | 5/2020 | Chao | ............... | G06N 3/084 |

* cited by examiner

*Primary Examiner* — Idowu O Osifade
(74) *Attorney, Agent, or Firm* — Kunzler Bean & Adamson

(57) ABSTRACT

Methods, communication devices, and computer-readable medium are disclosed for preventing unintentional outgoing communications initiated from a communication device. In one embodiment, the method includes receiving a request via a first input device to initiate a communication to a contact, determining whether the request is unlikely, receiving a confirmation that the request is intentional responsive to determining the request is unlikely, and sending the communication to the contact responsive to receiving the confirmation.

20 Claims, 5 Drawing Sheets

APPARATUSES, METHODS, AND COMPUTER-READABLE MEDIUM FOR REDUCING INADVERTENT USER INTERFACE INTERACTIONS

FIELD

The subject matter disclosed herein relates generally to communications and more particularly relates to apparatuses, communication devices, methods, and computer-readable medium for avoiding unintentional communication transmissions.

BACKGROUND

Inadvertent inputs (e.g., touch) of a communication device (e.g., smart phone) cause unexpected and unwanted actions (e.g., sending outgoing calls). Also, accidental brushes, taps, or bumps that occur when placing your phone, tablet, or detachable personal computer in a pocket, purse, or backpack can trigger a phone call or garbled message (e.g., text, email, or chat), especially if the device was left with the contacts or a communications application open.

BRIEF SUMMARY

Methods, communication devices, and computer-readable medium are disclosed for preventing unintentional outgoing communications initiated from a communication device. In one embodiment, the method includes receiving a request via a first input device to initiate a communication to a contact, determining whether the request is unlikely, receiving a confirmation that the request is intentional responsive to determining the request is unlikely, and sending the communication to the contact responsive to receiving the confirmation.

In another embodiment, a communication device includes a first input device, a second input device being different than the first input device, an output device, a communication device, a processor, and a storage device configured to store machine-readable instructions. The processor is in data communication with the first input device, the second input device, the output device, and the communication device. The instructions, when executed by the processor, cause the processor to receive from the first input device a request to initiate a communication to a contact, determine whether the request is unlikely, receive a confirmation that the request is intentional responsive to determining the request is unlikely, and send the communication to the contact responsive to receiving the confirmation.

In still another embodiment, a non-transitory computer-readable medium storing machine-readable instructions that, when executed by a processor of a computing system, cause the processor to receive from a first input device a request to initiate a communication to a contact, determine whether the request is unlikely, receive a confirmation that the request is intentional responsive to determining the request is unlikely, and send the communication to the contact responsive to receiving the confirmation.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore considered to be limiting of scope, the embodiments will be described and explained with additional specificity and detail through the use of the accompanying drawings, in which.

DETAILED DESCRIPTION

Figure 1:
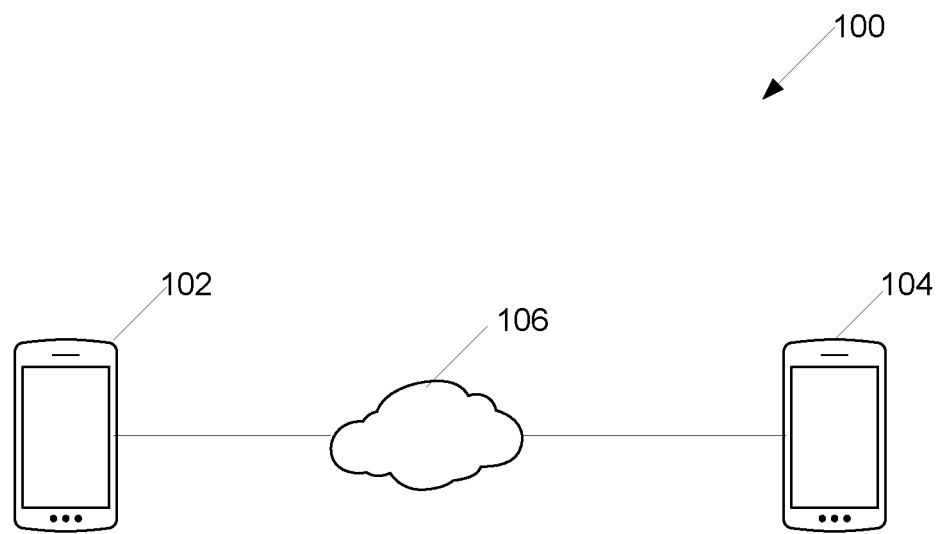
FIG. 1 is a schematic block diagram illustrating one embodiment of a communication system.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmittable. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), solid state drive (SSD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a communication system 100 having a communication device 102 that limits unintended/accidental message delivery to a recipient device 104 across a public or private network 106. Even though a specific number of communication devices 102 and recipient devices 104 are depicted in FIG. 1, one of skill in the art will recognize that any number of communication devices 102 and recipient devices 104 may be included in the communication system 100.

In one embodiment, the communication device 102 may include computing devices, such as desktop computers, laptop computers, personal digital assistants ("PDAs"), tablet computers, smart phones, media players, smart televisions (e.g., televisions connected to the Internet) with remote control devices, smart watches, optical head-mounted displays, or the like. In some embodiments, the communication device 102 includes any device having an input device capable of interacting with the communication application program, such as, without limitation, email, text messaging, cellular or voice-over-IP calls, or the like. The communication device 102 may communicate directly with one or more of the recipient devices 104.

In various embodiments, the features described herein are particularly well-suited to devices such as smartphones, handheld computers, media players, and PDAs, which are often used as mobile devices and which may be carried in a pocket or purse, or on a belt. Such devices commonly have telephone, email, and/or text messaging capability, and may perform other functions including, for example, playing music and/or video, surfing the web, running productivity applications, and the like. Such devices are often susceptible to being accidentally activated by incidental and unintentional contact with other objects in the pocket or purse, or by the user's hand, or by other objects. Accordingly, the following description is intended to illustrate various embodiments of the invention by way of example, rather than to limit the scope of the claimed invention.

Figure 2:
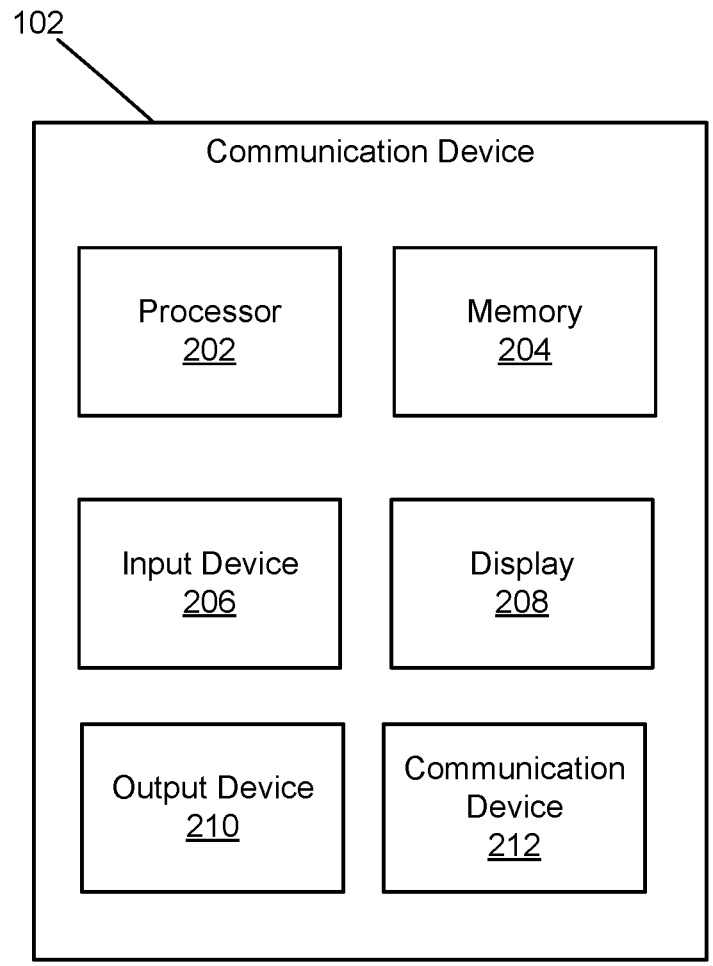
FIG. 2 is a schematic block diagram illustrating one embodiment of a communication device formed in accordance with an embodiment.

Referring to FIG. 2, in various embodiments, the communication device 102 includes a processor 202, a memory 204, an input device(s) 206, a display 208, and output device(s) 210, and a communication device 212. The memory 204 stores non-transitory computer-readable instructions that, when executed by the processor 202, cause the processor 202 to limit or control inadvertent or accidental user activation of the input device 206 that would result in generating and sending unintended messages to the recipient device 104 via the communication device 212 and the network 106. A plurality of input devices 206 and output devices 210 may be used.

In one embodiment, the display 208 and the input device 206 are combined as a touch-sensitive screen that allows for direct manipulation of objects displayed on-screen. In various embodiments, the touch-sensitive screen can be implemented using any technology that is capable of detecting a location of contact. In other embodiments, the input device 206 is a touch-sensitive surface, such as a touchpad, separate from the screen; such touchpads (also known as trackpads) are well known for manipulating on-screen objects in devices such as laptop computers. In another embodiment, the input device 206 is a keyboard and/or pointing device such as a trackball, roller switch, stylus, touchpad, mouse, or the like. In one embodiment, the input device 206 on which the screen is presented also includes a touch-sensitive gesture area (not shown) for entering gesture-based commands. In one embodiment, the input device 206 is a sensor (e.g., camera, motion sensor, or the like) configured to sense gestures or motion of a user. In one embodiment, the input device 206 is a microphone configured to record sound of a user of the communication device 102 or sound surrounding the communication device 102.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the output device 210, and the communication device 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the communication device 102.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. One skilled in the art will recognize that many types of touch-sensitive screens and touch-sensitive surfaces exist and are well-known in the art, including for example:

capacitive screens/surfaces, which detect changes in a capacitance field resulting from user contact;

resistive screens/surfaces, where electrically conductive layers are brought into contact as a result of user contact with the screen or surface;

surface acoustic wave screens/surfaces, which detect changes in ultrasonic waves resulting from user contact with the screen or surface;

infrared screens/surfaces, which detect interruption of a modulated light beam or which detect thermal induced changes in surface resistance;

strain gauge screens/surfaces, in which the screen or surface is spring-mounted, and strain gauges are used to measure deflection occurring as a result of contact;

optical imaging screens/surfaces, which use image sensors to locate contact;

dispersive signal screens/surfaces, which detect mechanical energy in the screen or surface that occurs as a result of contact;

acoustic pulse recognition screens/surfaces, which turn the mechanical energy of a touch into an electronic signal that is converted to an audio file for analysis to determine position of the contact; and frustrated total internal reflection screens, which detect interruptions in the total internal reflection light path.

In certain embodiments, the output device 210 includes one or more speakers for producing sound. For example, the output device 210 may produce an audible alert or notification (e.g., a beep or chime). In some embodiments, the output device 210 includes one or more haptic devices for producing vibrations, motion, or other haptic feedback. In some embodiments, all or portions of the display 208 or the output device 210 may be integrated with the input device 206.

In various embodiments, the instructions cause the processor 202 to receive from the input device 206 a request to send a communication (e.g., phone call, text message, email, post to social media site, or the like) to one or more of the recipient devices 104, determine if the request is unlikely based on a number of factors, and then request that the user confirms that a suspected unlikely request is really to be sent. The factors used to determine whether the request is unlikely may include time of day, light characteristics (e.g., intensity) sensed by the input device 206, improper grammar or misspellings if the request includes text, information associated with the recipient device 104 identified with the request, or the like. For example, if the time of day is 5 AM, the request is determined unlikely. This may be due to it being too early and/or historical use information of the communication device 102 that is stored in the memory 204 indicates that the communication device 102 is rarely used at 5 AM. For example, historical use information indicates that texting is done between 5-7 am, however phone calls are not. If, for example the request is at 9 AM, the request is determined as being likely due to a predefined criteria or the historical use information, then the message associated with the request is sent to the recipient device 104 without confirmation.

In another example, the request inadvertently generated by a user of the communication device 102 is a message that includes text having a number of grammatical or misspellings that are greater than a threshold amount or the text includes unrecognizable words. In these situations, the associated request is unlikely thus prompting delivery of a confirmation request to the user. For example, the following misspelling/unrecognizable word—"ASDFLKJWERKJ" causes a determination that the associated message is unlikely. This can include severity of spelling or grammatical errors that is greater than a severity threshold. A misspelling such as "r u up" would be considered likely, because of an association of that phrase with previously determined abbreviation terminology.

In still another example, a contact associated with the recipient device 104 identified in the generated communication is determined to not be a frequently used contact thus identifying the associated message as unlikely. A confirmation request is delivered in such a scenario. In still another example, a contact associated with the recipient device 104 is included in the request, however according to historical use information this contact is not used during the time associated with the request, thus indicating that the request is unlikely.

In various embodiments, a confirmation responsive to a confirmation request may be received through an input device that is different than the input device that initiated the communication request. For example, the communication request was initiated from an inadvertent touch input on a touch screen. The confirmation request may be transmitted audibly, visually, or tactilely. Additionally, a user response to the confirmation request may be received by a different input device than how the communication request was initiated, such as physical keyboard buttons, a gesture (nod or thumbs up) captured by a camera-type input device, a voice command received by a microphone input device, or a shake of the communication device as sensed by a motion sensor (i.e., accelerometer, gyroscope, or the like).

In various embodiments, the response to the confirmation request may be passive. For example, a camera turns on to capture an image responsive to the processor 202 determining that the communication request is unlikely. If the processor 202 determines that the captured image indicates that a user of the communication device 102 is looking at the display 208, then the processor 202 concludes that the touch presses (i.e., the communication request) were intentional. If captured image or light values produced by a light sensor of the communication device 102 indicate that the communication device 102 is most likely inside a pocket or bag, then the communication request is not validated (i.e., confirmed unlikely), thus not sending the communication request.

Figure 3:
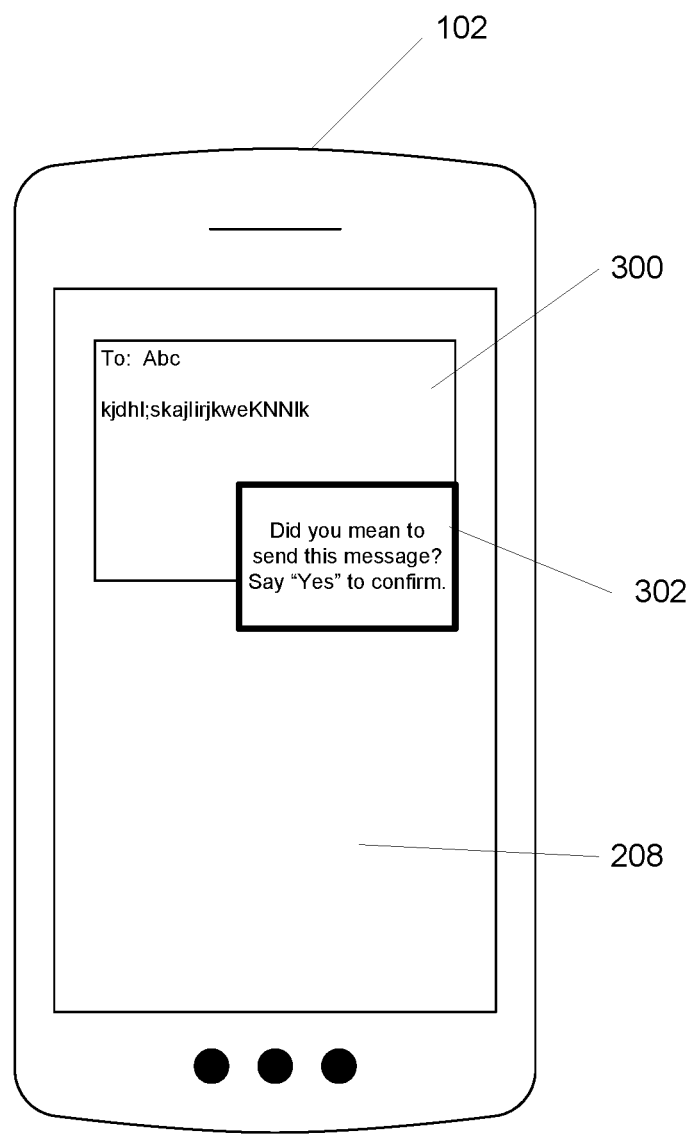
FIG. 3 is a front view of an exemplary communication device formed in accordance with an embodiment.

Referring to FIG. 3, the communication device 102 presents on the display 208 a graphical user interface (GUI) message 300 of a text messaging system that has a clear misspelling in a body section of the GUI message 300. The communication device 102 determines that this particular GUI message 300 is questionable either due to the misspelling or some other reason (e.g., particular contact, time of day, or a combination thereof). In response to determining that the GUI message 300 is questionable, a confirmation request 302 is presented on the display 208 or any number of ways. The confirmation request 302 prompts a user to confirm that the GUI message 300 was intended to be sent. The user may respond to the prompt as described above to confirm or deny the validity of the GUI message 300.

Figure 4:
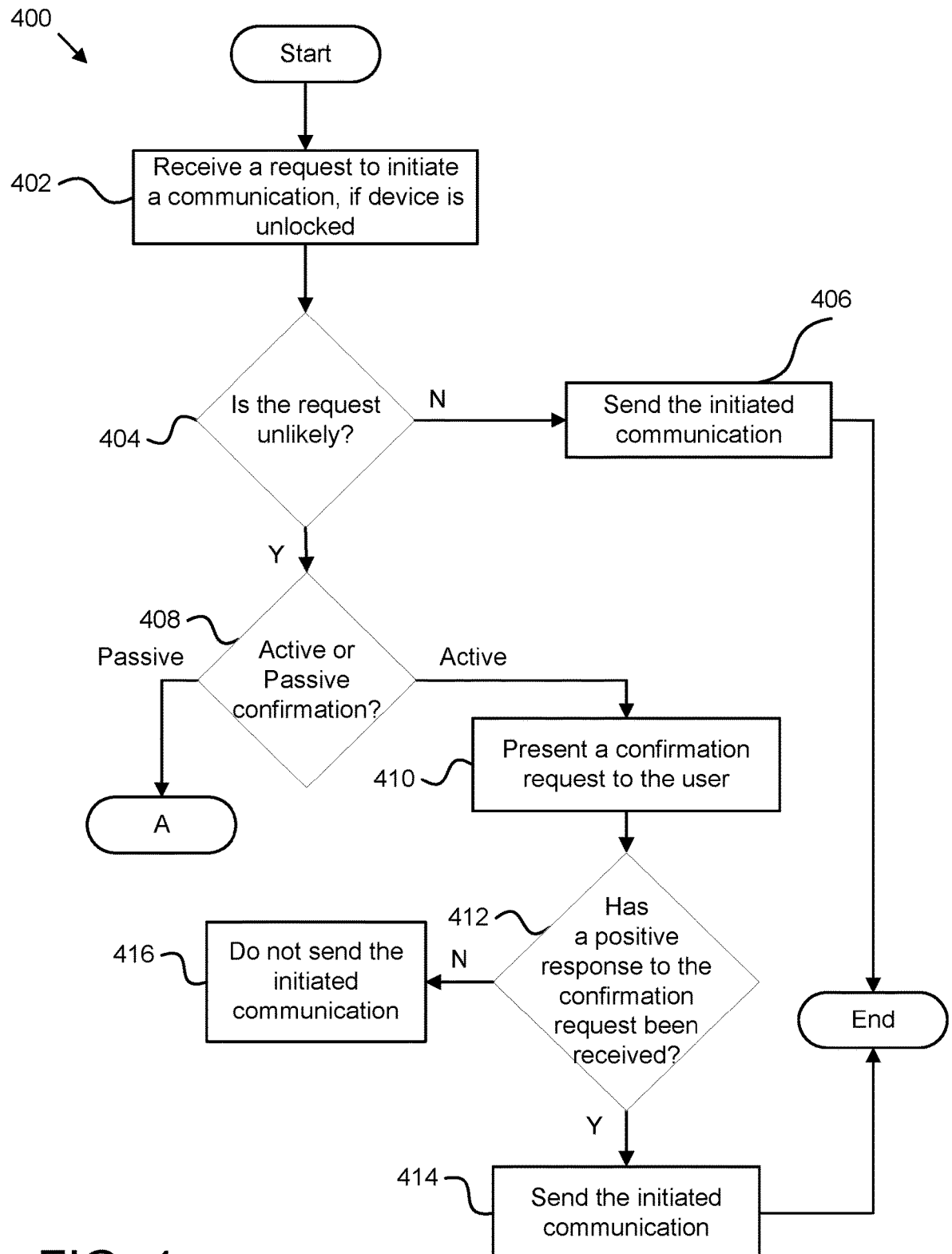
FIG. 4 is a flow diagram of a method performed by a communication device in accordance with an embodiment.

Referring to FIG. 4, a flow diagram of a method 400 is described. At a block 402, a request to initiate a communication is received by an input device of a communication device when the communication device is in an unlocked mode. In a locked mode, user interface components of the communication device are disabled except for entry of an unlocking action (e.g., fingerprint touch, code entry, eye/face scan, etc.) At a decision block 404, a processor of the communication device determines if the received request is unlikely. If the request is determined not unlikely, then at a block 406, the communication is completed (i.e., sent). If the request is determined unlikely, then at a decision block 408, the method 400 determines if an active or passive confirmation is to occur. If the confirmation is to be active, then at a block 410, a confirmation request is presented to a user of the communication device. At a block 412, the method 400 determines if a positive response to the confirmation request has been received. At a block 414, in response to receiving the positive response, the communication associated with the request is completed (i.e., sent). At a block 416, in response to not receiving the positive response, the communication associated with the request is not completed (i.e., not sent).

Figure 5:
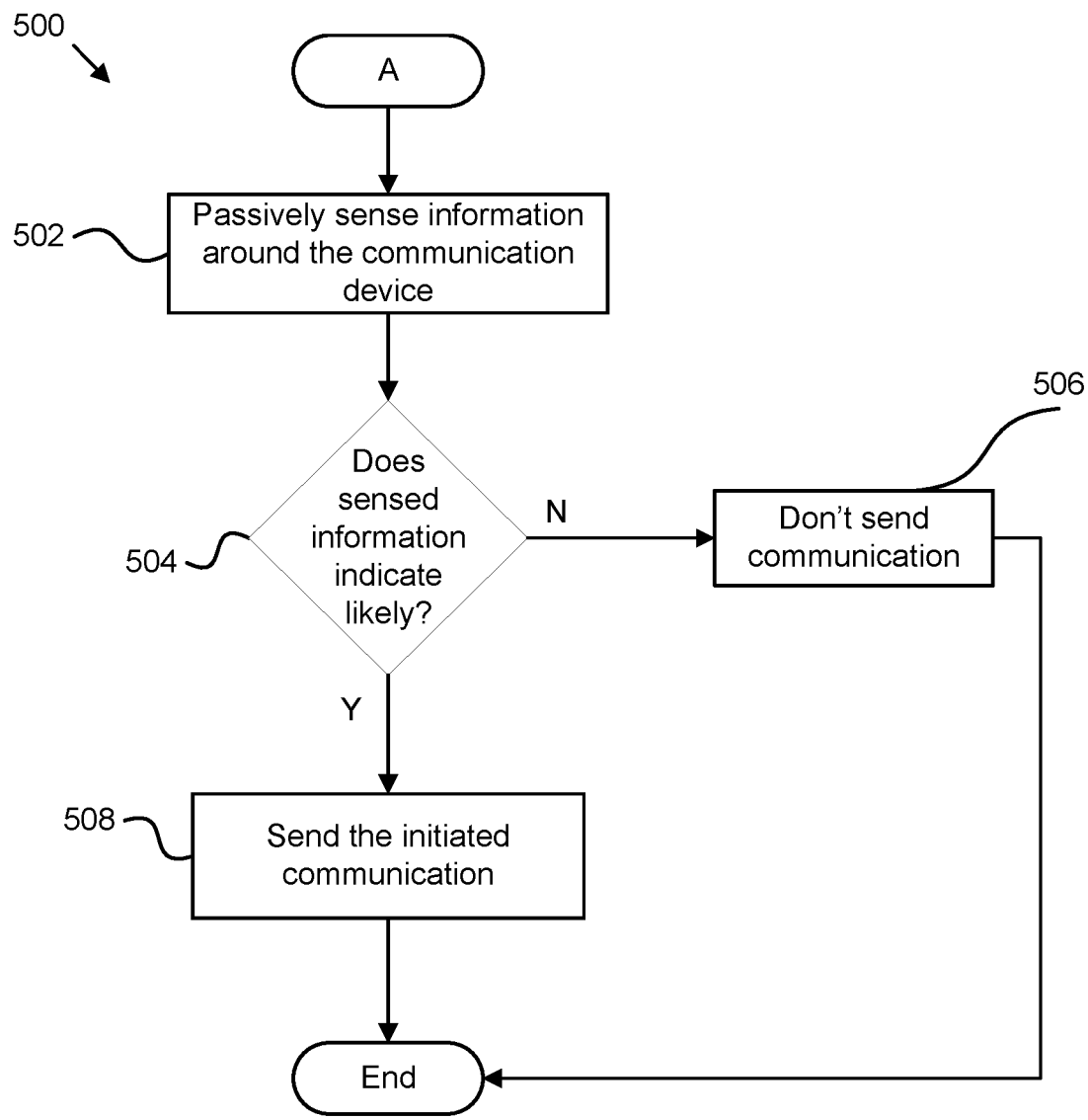
FIG. 5 is a flow diagram of a continuation of the method of FIG. 4.

Referring to FIG. 5, a method 500 extends from the decision block 408 when the confirmation is to be passive. At a block 502, passive sensing of information around the communication device is performed. At a decision block 504, the method 500 determines if the sensed information is indicating that the initiated communication is likely. If the initiated communication is not determined likely, then at a block 506, the initiated communication is not sent. If the initiated communication is determined likely, then at a block 508, the initiated communication is sent.

Embodiments

A. An exemplary method for preventing an unintentional outgoing communication initiated from a communication device includes receiving a request via a first input device to initiate a communication to a contact, determining whether the request is unlikely, receiving a confirmation that the request is intentional responsive to determining the request is unlikely, and sending the communication to the contact responsive to receiving the confirmation.

B. The method according to A, further comprising outputting a confirmation request based on determining the request is unlikely, wherein receiving the confirmation comprises receiving a positive response to the confirmation request via the second input device, the second input device being different than the first input device.

C. The method of B, wherein outputting the confirmation request comprises displaying a confirmation request on a display device of the communication device or outputting an audio signal via a speaker of the communication device.

D. The method of any of A-C, wherein receiving the confirmation comprises receiving information from a sensor of the communication device and generating the confirmation responsive to the information from the sensor indicating that the communication device is in a likely communication location or a user of the communication device is positioned for communication initiation.

E. The method of D, wherein the information from the sensor comprises ambient light information or a camera image and generating the confirmation is further responsive to the ambient light information being greater than a threshold amount or the camera image indicating user engagement.

F. The method of E, wherein receiving the confirmation comprises activating a camera responsive to determining the request is unlikely.

G. The method of any of A-F, wherein the communication includes a text message or an email, receiving the request to initiate the communication further comprises receiving content of the text message or the email, and determining whether the request is unlikely further comprises determining the communication is unlikely responsive to the content having a number of spelling or grammatical errors greater than a threshold amount.

H. The method of any of A-G, wherein the communication includes a time stamp and determining whether the request is unlikely further comprises determining the communication is unlikely responsive to the time stamp indicating an unlikely time of day or day of week.

I. The method of any of A-H, wherein determining whether the request is unlikely further comprises determining the communication is unlikely responsive to the contact and historical information of previously sent communications.

J. A communication device includes a first input device, a second input device being different than the first input device, an output device, a communication device, a processor in data communication with the first input device, the second input device, the output device, and the communication device, and a storage device configured to store machine-readable instructions. The instructions, when executed by the processor, cause the processor to receive from the first input device a request to initiate a communication to a contact, determine whether the request is unlikely, receive a confirmation that the request is intentional responsive to determining the request is unlikely, and send the communication to the contact responsive to receiving the confirmation.

K. The communication device of J, further comprising a second input device, wherein the machine-readable instructions further cause the processor to output a confirmation request based on determining the request is unlikely and receiving the confirmation comprises receiving a positive response to the confirmation request via the second input device, the second input device being different than the first input device.

L. The communication device of J or K, wherein the output device comprises a display device or a speaker configured to output the confirmation request.

M. The communication device of any of J-L, further comprising a sensor configured to sense information about the communication device or around the communication device, wherein the machine-readable instructions further cause the processor to generate the confirmation responsive to the sensed information indicating that the communication device is in a likely communication location or a user of the communication device is positioned for communication initiation.

N. The communication device of M, wherein the sensor is a camera configured to generate ambient light information or an image and the machine-readable instructions further cause the processor to generate the confirmation further responsive to the ambient light information being greater than a threshold amount or the camera image indicating user engagement.

O. The communication device of N, wherein the machine-readable instructions further cause the processor to activate the camera responsive to determining the request is unlikely.

P. The communication device of any of J-O, wherein the communication includes content of a text message or an email and the machine-readable instructions further cause the processor to determine the communication is unlikely responsive to the content having a number of spelling or grammatical errors greater than a threshold amount.

Q. The communication device of any of J-P, wherein the communication includes a time stamp and the machine-readable instructions further cause the processor to determine the communication is unlikely responsive to the time stamp indicating an unlikely time of day or day of week.

R. A non-transitory computer-readable medium storing machine-readable instructions that, when executed by a processor of a computing system, cause the processor to receive from a first input device a request to initiate a communication to a contact; determine whether the request is unlikely; receive a confirmation that the request is intentional responsive to determining the request is unlikely; and send the communication to the contact responsive to receiving the confirmation.

S. The computer-readable medium of R, wherein the machine-readable instructions that, when executed by the processor of the computing system, cause the processor to request the confirmation from a user using a second input device of the computing system.

T. The computer-readable medium of R or S, wherein the machine-readable instructions that, when executed by the processor of the computing system, cause the processor to determine the confirmation responsive to information from a sensor associated with the computing system.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for preventing an unintentional outgoing communication initiated from a communication device, the method comprising:
   receiving a request input, via a first input device, to initiate a communication to a contact;
   determining whether the request input is unlikely;
   presenting a confirmation request to a user responsive to determining the request is unlikely;
   determining whether a confirmation input indicating that the request input is intentional is received from the user;
   sending the communication to the contact responsive to receiving the confirmation input; and
   declining to send the communication to the contact responsive to not receiving the confirmation input indicating that the request input is intentional,
   wherein the request input and the confirmation input are different input types.

2. The method of claim 1, further comprising:
   receiving the confirmation input indicating that the request input is intentional,
   wherein:
      receiving the confirmation input comprises receiving a positive response input to the confirmation request from the user via a second input device, and
      the second input device is different from the first input device.

3. The method of claim 2, wherein presenting the confirmation request to the user comprises one of displaying the confirmation request on a display device of the communication device or outputting an audio signal via a speaker of the communication device.

4. The method of claim 2, wherein receiving the confirmation input comprises:
   receiving, from a sensor of the communication device, one of information about the communication device or information about an environment around the communication device; and
   generating the confirmation input responsive to the information from the sensor indicating that one of the communication device is in a likely communication location or the user is positioned for communication initiation.

5. The method of claim 4, wherein:
   the information from the sensor comprises one of ambient light information or a camera image; and
   generating the confirmation input is further responsive to one of the ambient light information being greater than a threshold amount or the camera image indicating user engagement.

6. The method of claim 5, wherein receiving the confirmation input comprises activating a camera responsive to determining the request is unlikely.

7. The method of claim 1, wherein:
   receiving the request input to initiate the communication further comprises receiving one of a text message or an email; and
   determining whether the request input is unlikely further comprises determining the communication is unlikely responsive to the one of the text message or the email including a first quantity of spelling errors greater than a first threshold amount, a second quantity of grammatical errors greater than a second threshold amount, a third quantity of a severity of spelling errors greater than a third threshold amount, or a fourth quantity of severity of grammatical errors greater than a fourth threshold amount.

8. The method of claim 1, wherein:
   the communication includes a time stamp; and
   determining whether the request input is unlikely further comprises determining the communication is unlikely responsive to the time stamp indicating one of an unlikely time of day or an unlikely day of week.

9. The method of claim 1, wherein determining whether the request input is unlikely further comprises determining the communication is unlikely responsive to one of information of the contact, one or more time stamps associated with the request, historical information of one or more previously sent communications, or a combination thereof.

10. A communication device, comprising:
    a first input device;
    a processor in data communication with the first input device; and
    a storage device configured to store machine-readable instructions that, when executed by the processor, cause the processor to:
       receive, from the first input device, a request input to initiate a communication to a contact;
       determine whether the request input is unlikely;
       present a confirmation request to a user responsive to determining the request is unlikely;
       determine whether a confirmation that that the request is intentional is received from the user;
       send the communication to the contact responsive to receiving the confirmation input; and
       decline to send the communication to the contact responsive to not receiving the confirmation input indicating that the request input is intentional,
       wherein the request input and the confirmation input are different input types.

11. The communication device of claim 10, further comprising:
    a second input device different from the first input device in data communication with the processor,
    wherein:
       the machine-readable instructions further cause the processor to receive the confirmation input indicating that the request input is intentional, and receiving the confirmation input comprises receiving a positive response input to the confirmation request from the user via the second input device.

12. The communication device of claim 10, further comprising:
an output device in data communication with the processor,
wherein the output device comprises one of a display device or a speaker configured to output the confirmation request.

13. The communication device of claim 10, further comprising:
a sensor in data communication with the processor and configured to sense one of information about the communication device or information about an environment around the communication device,
wherein the machine-readable instructions further cause the processor to generate the confirmation input responsive to the sensed information indicating that one of the communication device is in a likely communication location or the user is positioned for communication initiation.

14. The communication device of claim 13, wherein:
the sensor includes a camera configured to generate one of ambient light information or an image; and
the machine-readable instructions further cause the processor to generate the confirmation input further responsive to one of the ambient light information being greater than a threshold amount or the camera image indicating user engagement.

15. The communication device of claim 14, wherein the machine-readable instructions further cause the processor to activate the camera responsive to determining the request input is unlikely.

16. The communication device of claim 10, wherein:
the communication includes one of a text message or an email; and
the machine-readable instructions further cause the processor to determine the communication is unlikely responsive to the one of the text message or the email including a first quantity of spelling errors greater than a first threshold amount, a second quantity of grammatical errors greater than a second threshold amount, a third quantity of a severity of spelling errors greater than a third threshold amount, or a fourth quantity of severity of grammatical errors greater than a fourth threshold amount.

17. The communication device of claim 10, wherein:
the communication includes a time stamp; and
the machine-readable instructions further cause the processor to determine the communication is unlikely responsive to the time stamp indicating one of an unlikely time of day or an unlikely day of week.

18. A non-transitory computer-readable medium storing machine-readable instructions that, when executed by a processor of a computing system, cause the processor to:
receive, from a first input device of the computing system, a request input to initiate a communication to a contact;
determine whether the request input is unlikely;
present a confirmation request to a user responsive to determining the request is unlikely;
determine whether a confirmation input indicating that the request is intentional is received from the user;
send the communication to the contact responsive to receiving the confirmation input; and
decline to send the communication to the contact responsive to not receiving the confirmation input indicating that the request input is intentional,
wherein the request input and the confirmation input are different input types.

19. The computer-readable medium of claim 18, wherein:
the computing system further comprises a second input device; and
the machine-readable instructions that, when further executed by the processor of the computing system, cause the processor to request the confirmation input from the user be received from the second input device.

20. The computer-readable medium of claim 18, wherein:
the computing system further comprises a sensor; and
the machine-readable instructions that, when further executed by the processor of the computing system, cause the processor to:
receive one of information about the computing system or information about an environment around the computing system, and
determine the confirmation input responsive to the one of the information about the computing system or the information about the environment around the computing system received from the sensor.

* * * * *